US012712876B2

(12) United States Patent
Pastore et al.

(10) Patent No.: US 12,712,876 B2
(45) Date of Patent: Aug. 18, 2026

(54) METHOD FOR CONFIRMING THE IDENTITY OF A USER IN A BROWSING SESSION OF AN ONLINE SERVICE

(71) Applicant: Cleafy Società per Azioni, Milan (IT)

(72) Inventors: Nicolò Pastore, Pero (IT); Carmine Giangregorio, Milan (IT)

(73) Assignee: Cleafy Società per Azioni, Milan (IT)

( * ) Notice: Subject to any disclaimer, the term of this patent is extended or adjusted under 35 U.S.C. 154(b) by 252 days.

(21) Appl. No.: 17/871,117

(22) Filed: Jul. 22, 2022

(65) Prior Publication Data

US 2023/0027253 A1 Jan. 26, 2023

(30) Foreign Application Priority Data

Jul. 23, 2021 (IT) ........................ 102021000019634

(51) Int. Cl.

*H04L 9/40* (2022.01)
*G06F 21/31* (2013.01)
*G06N 20/00* (2019.01)

(52) U.S. Cl.

CPC .......... *H04L 63/0861* (2013.01); *G06F 21/31* (2013.01); *G06F 21/316* (2013.01); *G06N 20/00* (2019.01)

(58) Field of Classification Search

CPC ... H04L 63/0861; G06F 21/31; G06F 21/316; G06F 9/45529; G06F 21/00; G06F 21/30; G06F 9/52; G06N 20/00

See application file for complete search history.

(56) References Cited

U.S. PATENT DOCUMENTS 9,639,678 B2 * 5/2017 Moore .................. H04L 63/102
10,803,436 B2 10/2020 Kobres et al.
11,496,458 B1 * 11/2022 Anand .................. H04L 67/141
2011/0016534 A1 1/2011 Jakobsson et al.
2013/0239195 A1 * 9/2013 Turgeman ............ G06F 21/316 726/19
2015/0242601 A1 8/2015 Griffiths et al.
2016/0142399 A1 * 5/2016 Pace ....................... G06F 21/41 726/4
2017/0099280 A1 * 4/2017 Goel ..................... H04L 67/146

(Continued)

FOREIGN PATENT DOCUMENTS

CN 108881130 A * 11/2018 ......... H04L 63/0815
CN 109743233 A * 5/2019

(Continued)

OTHER PUBLICATIONS

Italian Search Report dated Apr. 5, 2022; Application 102021000019634; 11 pages.

*Primary Examiner* — Joseph G Ustaris
(74) *Attorney, Agent, or Firm* — RANKIN, HILL & CLARK LLP; Erik J. Overberger

(57) ABSTRACT

A method for confirming the identity of a user in a browsing session of an online service is described. The method comprises providing a particular web server, providing a certain database, providing a script in a client device, identifying via script each browsing session, collecting via script biometric data, generating via script machine learning templates, storing the biometric data and templates, generating a score, sending the score to a web server, and verifying the identity of the user by processing the score.

10 Claims, 3 Drawing Sheets

(56) References Cited

U.S. PATENT DOCUMENTS

2017/0154366 A1* 6/2017 Turgeman ............. G06F 21/316
2018/0007167 A1* 1/2018 Biron, III ................ H04L 67/14
2018/0039990 A1 2/2018 Lindemann
2020/0145416 A1* 5/2020 Mitzimberg .......... G06F 21/556
2020/0244639 A1* 7/2020 Arif Khan ............. G06N 20/10
2021/0141888 A1* 5/2021 Hires .................... H04L 9/3231
2022/0067138 A1* 3/2022 Paert ................... H04L 63/0815

FOREIGN PATENT DOCUMENTS

WO WO 2015/127256 8/2015
WO WO 2019/190619 10/2019
WO WO-2021009645 A1 * 1/2021 ............. G06F 21/30

* cited by examiner

METHOD FOR CONFIRMING THE IDENTITY OF A USER IN A BROWSING SESSION OF AN ONLINE SERVICE

FIELD OF APPLICATION

The present invention relates to a method for confirming the identity of a user in a browsing session of an online service.

Specifically, the method of the invention allows the user's identity to be verified by analysing the biometric data collected on the client device, but without sharing or transmitting such sensitive data outside the client device environment. In other words, the method concerns the analysis of sensitive privacy-by-design data with the results being sent to the back-end of the online service in a secure and certified manner. In more detail, the method allows the processing of sensitive data of the user without the need for an explicit acceptance request by the user for the protection of the privacy, reducing the compliance impacts related to the explicit consent request for the collection of sensitive data.

Description of the Prior Art

It is known in the art to use machine learning templates related to the analysis of user biometric data, such as typing on local endpoints. In particular, the user's biometric data are collected when the same uses a user interface of the client device, such as the keyboard, the mouse or the touch screen. The data collected, subject to the user's explicit authorisation dictated by the regulations for the protection of his privacy, are sent directly to the back-end to be handled and processed.

Document US 2018/039990 A1 describes a system and method for performing eye detection during authentication. The method includes the steps of: receiving a request to authenticate a user; presenting one or more screen layouts to the user; capturing a sequence of images that include the user's eyes while one or more screen layouts are being displayed; and performing eye movement detection through the sequence of images to identify a correlation between the user's eye movement when one or more screen layouts are presented and an expected movement of the user's eyes when one or more screen layouts are presented and/or measuring the size of the eye pupil to identify a correlation between the intensity of the actual light of the screen and its effect on the size of the user's eye pupil; capturing the audio of the user's voice; and performing speech recognition techniques to determine a correlation between the captured audio of the user's voice and one or more voiceprints.

Problem of the Prior Art

In the prior art, taking the case of Behavioral Biometrics Analysis as an example, in the case of a standard architecture where data are collected and immediately sent to the back-end for server-side analysis, there would be essentially two problems to deal with.

The first problem concerns the fact that biometric data are sensitive or special data. For this reason, an explicit acceptance by the user is necessary for their collection, and particularly complex management is also necessary, especially from the point of view of the legal compliance of the biometric data collected.

The second problem relates to the fact that the creation of a machine learning template starting from biometric data requires the training of a template for each individual user. The computational cost for such processing increases with the number of application users, requiring considerable resources on the back-end.

Finally, it should be noted that, in the prior art, a potential fraudster should give consent to the processing of his biometric data. It is clear how a monitoring of such data for security purposes would be completely nullified by the fraudster's denial of consent to the processing of the data hidden behind the authenticated user's session.

Document US 2018/039990 A1 has the advantage of preserving the user's privacy by providing for the local storage of the user's biometric data. However, this method has limitations in that the analyses carried out on such biometric data are performed with respect to expected generic parameters, which are not associated with the behaviour of the specific user.

SUMMARY OF THE INVENTION

The object of the invention in question is to realise a method for confirming the identity of a user in a browsing session of an online service, analysing the biometric data of the same user without compliance obligations and guaranteeing a high level of privacy.

A further object of the invention is to realise a method for confirming the identity of a user in a browsing session of an online service, based on the behavioural analysis of the specific user while preserving the privacy of the biometric data collected.

The specified technical task and the specified purposes are substantially achieved by a method comprising the technical characteristics set forth in claim 1.

Advantages of the Invention

Thanks to an embodiment, it is possible to achieve a method that allows the processing of sensitive data, such as biometric analysis data and personal user data, without having the burden of data management in terms of privacy protection.

Thanks to an embodiment, it is possible to realise a method that makes it possible to shift a large part of the computational load, which is adapted to analyse the data collected also by machine learning/artificial intelligence techniques, to the context of the user's device. Advantageously, it is possible to limit the computational cost that would otherwise be borne solely by the web server where the back-end of the online service resides.

Advantageously, the method allows for a user validation against authentication, i.e. a continuous authentication which confirms the identity of the authenticated user during the session by evaluating, for example, the biometrics of the mouse movements, typing, reaction times and speed of movement and touchstrokes on the touch screen.

BRIEF DESCRIPTION OF THE DRAWINGS

The characteristics and advantages of the present invention will become clear from the following detailed description of a possible practical embodiment, illustrated by way of non-limiting example in the set of drawings, wherein.

DETAILED DESCRIPTION

Figure 1:
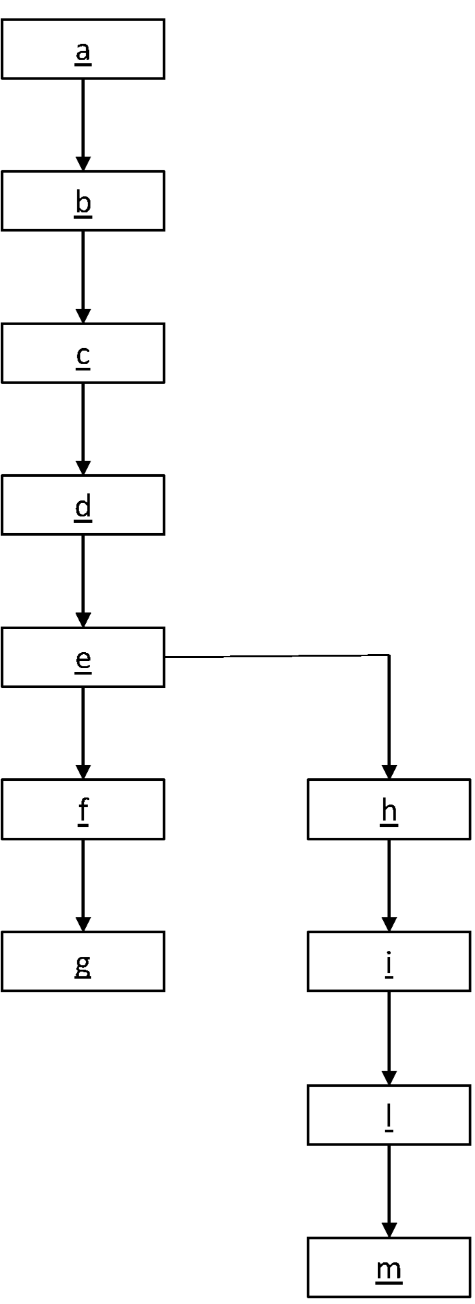
FIG. 1 shows a block diagram of the steps of the method according to the present invention.

The present invention relates to a method for confirming the identity of a user U in a browsing session of an online service. In the context of the present invention, a browsing session is understood to be the user's entire browsing session, comprising both the non-authenticated browsing part such as the Login phase, and the authenticated part after the user has logged in to the online service. The method has the advantage of allowing the analysis of the user's sensitive data, and in particular of the biometric data collected on his client device, without however violating his privacy since such data are never shared outside the client environment, that is, the endpoint of the user.

The method comprises step a) of providing a web server 1 in which an online service resides. By way of example, the online service may be the web portal or web application of a bank, or other platform whose access is protected by user authentication. The web server 1 is in communication with at least one client device 2 provided with at least one user interface 21. Again by way of example, the client device 2 can be a PC, a tablet or a smartphone. Such devices are therefore provided with at least one user interface 21 capable of collecting biometric data of the user, such as the keyboard, the mouse and the touch screen. Such biometric data are sensitive data as they are person-related data, identifying specific typing characteristics, such as the user's reaction time, the duration of keystrokes or the interval between one keystroke and the next, the typing sequence of certain words, or even specific movements of the mouse cursor or touchpad and the relative speed.

The method envisages step b) of providing a database 11 associated with the web server 1 in which a plurality of data relating to one or more users U, U', U" registered to the online service are stored. In other words, the database 11 being managed by the online service contains a set of standard data (first name, last name, date of birth, address, etc.) for authentication and registration of the user registered on the platform. These personal data are provided by the user U when he registers for the online service, with specific authorisation for their management in accordance with privacy protection regulations.

The method comprises step c) of providing a script 22 residing in the client device 2. Preferably, the script 22 comprises a javascript agent executable within a web browser of the client device 2, or a client library executable within a mobile application of the client device 2. Again preferably, the script comprises a set of scripts and is also called a privacy-by-design algorithm, which is executed in the context of the user endpoint, such as a javascript agent executed within a web browser; or a client library that is executed within a mobile application.

The method envisages step d) of identifying via script 22 each browsing session on the online service and of associating it with a user U registered to the online service when the latter performs authentication.

The method comprises step e) of collecting via script 22 biometric data generated by the at least one user interface 21 and of associating them with the authenticated user U. Biometric data comprise a set of sensitive data, such as typing pattern on the keyboard, cursor movement pattern, device usage pattern information, etc., collected within the context of the application endpoint. In other words, biometric data concern how a user uses his keyboard, such as key usage patterns/sequences. Similarly, the biometric data also concern the movement patterns, clicks, and the shift speed of the cursor, or more generally of the user interface 21. As will be seen in the following step, these data are passed as arguments to the machine learning/artificial intelligence algorithm contained in the script 22.

The method therefore comprises the step f) of generating via script 22 machine learning templates as a result of the processing of the biometric data. As anticipated, the script comprises one or more machine learning/artificial intelligence algorithms for the execution of step f). Preferably, step f) comprises the sub-step of generating the machine learning templates through one or more artificial intelligence algorithms and/or through heuristic algorithms and logic processes based on preset rules. It is worth noting that machine learning templates are built by processing biometric data locally which comprise the typing sequences on the keyboard, the cursor movement sequences, and information on the use of the user interface 21. Advantageously, in the context of behavioural analysis, the machine learning templates thus obtained are user-specific and therefore sensitive behavioural models.

The method comprises step g) of locally storing the biometric data and the machine learning templates, or at least a subset of such data, in the client device 2. In other words, sensitive biometric data are in no way shared outside the environment of the client device 2 as they are not sent to the web server 1. Preferably, step g) comprises the sub-step of storing the biometric data and the machine learning templates in the local memory 23 of the client device 2 or in the LocalStorage of the web browser of the client device 2 if mobile. Advantageously, the machine learning templates which, as explained above, are user-specific and therefore sensitive behavioural models, are processed and stored locally on the client device 2 in order to preserve the privacy of the user. The method thus allows the user's identity to be confirmed in a browsing session of an online service on the basis of the biometric data collected in real time, compared with the machine learning templates trained on the biometric data of the same user previously collected. Advantageously, by overcoming the drawbacks of the prior art, the method allows the user's identity to be confirmed on the basis of a behavioural analysis performed locally on the user's biometric data, using machine learning templates.

The method further comprises step h) of generating a score associated with the user U as a result of the processing via script 22 of new biometric data collected on the at least one user interface 21 as a function of the machine learning templates generated in step f). Preferably, step h) comprises the sub-step of attributing to the score a value between 0 and 1, where 0 represents a difference between the expected identity and the one calculated for the user U using the machine learning templates, while 1 represents an exact association between the expected and calculated identity for the user U using the machine learning templates. That is, 0 represents the absence of affinity or low affinity between the biometric data of the user U generated by the machine learning templates with respect to the current biometric data. Conversely, the value of 1 represents a high affinity or complete match between these data. Therefore, again within the context of the user endpoint, the script 22 comprises a function that inputs a subset of new sensitive data, returns a score based on the machine learning templates generated in step f). In other words, the score specifies the similarity value with respect to the machine learning template of reference for the user, confirming or not the identity of the user on the basis of the biometric data collected.

In addition, the method envisages step i) of sending the score to the web server 1. It is worth noting here that only one score is sent to the web server 1, i.e. a scoring that is indicative of the level of affinity between the biometric data of the user U at a given time instant with respect to the biometric data of the same user U collected previously through the machine learning templates. This score allows the web server 1 to verify whether the user U browsing the online service is effectively the authenticated user U, i.e. to what extent the identity of the user U browsing at a certain time instant corresponds to that of the authenticated user U. If the score indicates that the affinity is low, there might be a high risk that the user who is browsing is not the authenticated one. This could mean that the session is managed by a fraudster and that there is therefore a real risk of account takeover to the detriment of the authenticated user U. It should be further highlighted that there is no sharing of the sensitive biometric data with the web server 1, regardless of whether the real user U or the possible fraudster is behind the session. Still preferably, step i) comprises the sub-step of collecting and generating via script 22 technical data relating to the browsing of the client device 2 on the online service and sending them to the web server 1 together with the score. In addition to the collection of sensitive data, other parameters and environment variables are therefore collected in the same context of the user endpoint. Preferably, the technical data comprises one or more of the user name used in accessing the online service, browsing session ID, client device fingerprint, network data such as IP address, networks and authentication application context. It should be noted here that these data are in line with the data managed by the web server 1, i.e. those relating to the registration and authentication of the user U to the online service. Advantageously, these data provide an indication relative to the identity of the authenticated user and to the security or trust of the environment of the client device 2. Furthermore, the score, understood as the similarity value between the last biometric data collected and the machine learning templates relating to the user U, can then also be associated with other technical data collected both on the endpoint side and back-end side, which can be processed by the web server 1 to generate a level of risk.

The method comprises step l) of verifying the identity of the authenticated user U as a result of the score processing by means of a security algorithm 12 residing in the web server 1. Preferably, step l) comprises sub-step of generating a danger signal via the web server 1 when the score value exceeds a predefined threshold value. For instance, if the score value falls below 0.5, the security algorithm detects a real risk of account takeover in that the identity of the browsing user does not correspond to that of the authenticated user U.

It should be noted here that the method preferably envisages in step f) training the machine learning templates over time using gradually the new biometric data collected and used before to calculate the score, maintaining a learning dynamic for what concerns the biometric data of the user U.

Advantageously, the method of the present invention allows the user's identity to be verified by analysing his sensitive biometric data without the same data being shared outside the environment of the client device 2 or endpoint, such as with the back-end web server 1. In this way, the back-end does not handle the sensitive biometric data of the user U in any way, avoiding the burdens, the limitations and the authorisations associated with user privacy protection regulations. In fact, the analysis of the sensitive biometric data takes place only on the endpoint of the client, in a secure environment that preserves privacy, since only a score is sent to the back-end for security evaluation. The score does not in any way allow the user's biometric data to be reconstructed, as it only provides an indication of the affinity between the biometric data collected in the past through the machine learning templates and the biometric data of the current browsing session. Furthermore, data processing takes place on the client device 2 of each user U, U', U" for each user, dividing the computational burden on the individual devices instead of overloading the web server 1. In fact, the processing should otherwise take place in back-end independently for each user, requiring a huge computation cost, without neglecting the fact that the user should give his explicit consent to the collection and management of his sensitive biometric data.

According to a preferred embodiment of the invention, the method comprises step m) of activating security countermeasures on the client device 2 when the web server 1 generates the danger signal. Preferably, the security countermeasures comprise one or more among blocking the login of the user U, requesting a Strong Customer Authentication, blocking one or more transactions or actions performed by the user U in the browsing session, and informing the user U about his access at risk. Still preferably, step m) comprising the sub-step of initiating security countermeasures on the client device 2 if the technical data received from the web server 1 is indicative of a condition of poor browsing security on the client device 2.

In summary, the method of the invention allows monitoring the access to an external service, i.e., the back-end, to which the result of the analysis performed by the algorithm included in the script residing in the client device 2 is sent, together with other metadata (i.e., technical data) used to verify the integrity of the result (or score) collected.

The following describes an example of an implementation of the method of the present invention in the specific case of Behavioral Biometrics, with Keystroke Dynamics analysis on the endpoint side. As mentioned before, the method of the present invention advantageously allows to avoid managing sensitive data on the back-end, as well as distributing the computational calculation on the endpoint of each individual user for what concerns the processing of his sensitive biometric data, the generation of the machine learning templates and of the score.

In this example, the sensitive data are typing sequences on the keyboard by the user U requesting access to a web application via a web browser. The dynamic of the keystrokes is collected through the script 22 on the user's web browser, such as the time between keystrokes, the duration of the key in the down position, the amount of keys pressed, the letters and the symbols used. Therefore, such sensitive biometric data are collected in the local memory 23 of the web browser via the script 22.

Figure 2:
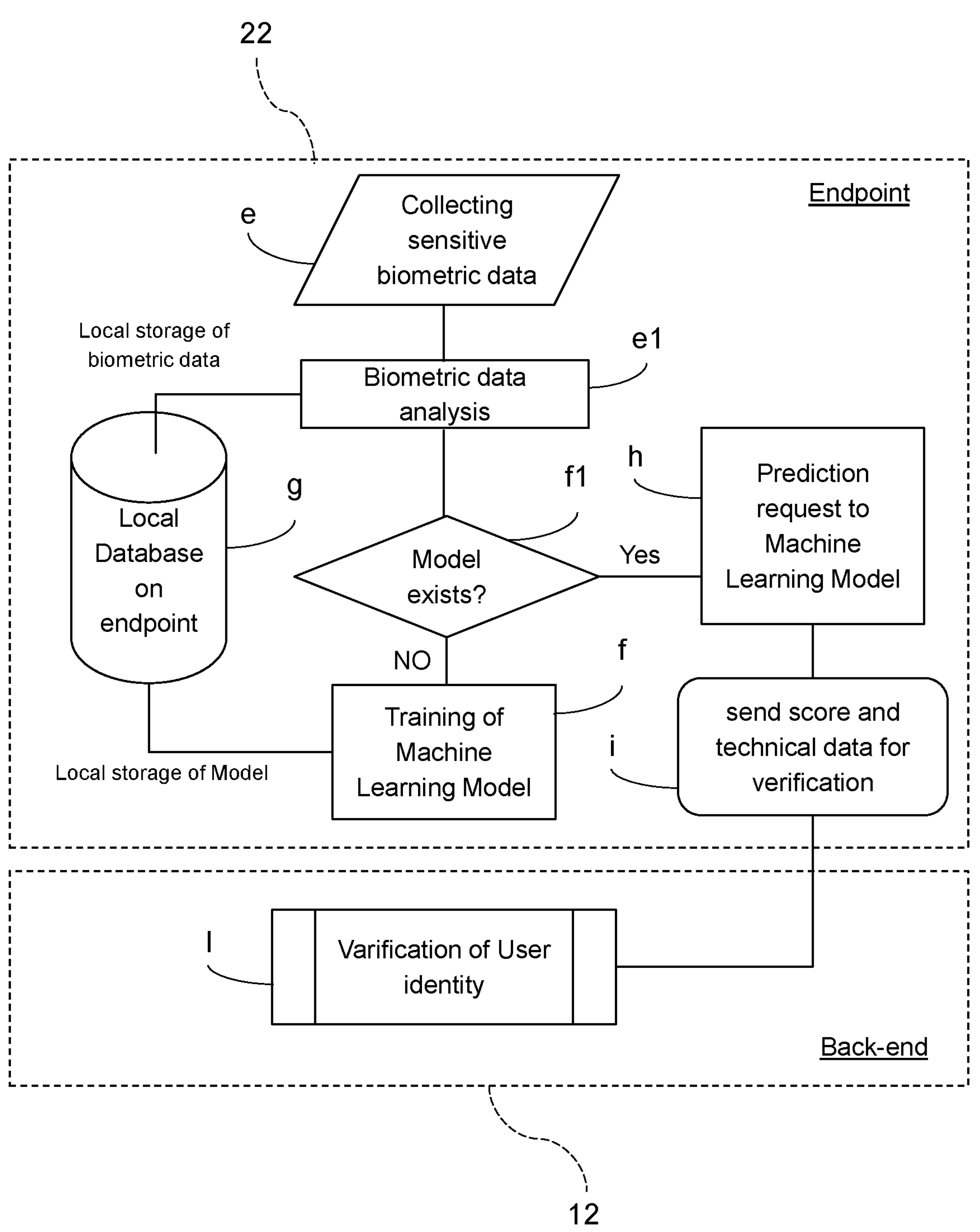
FIG. 2 shows a flow chart schematically illustrating a possible application of the method of the present invention.
Figure 3:
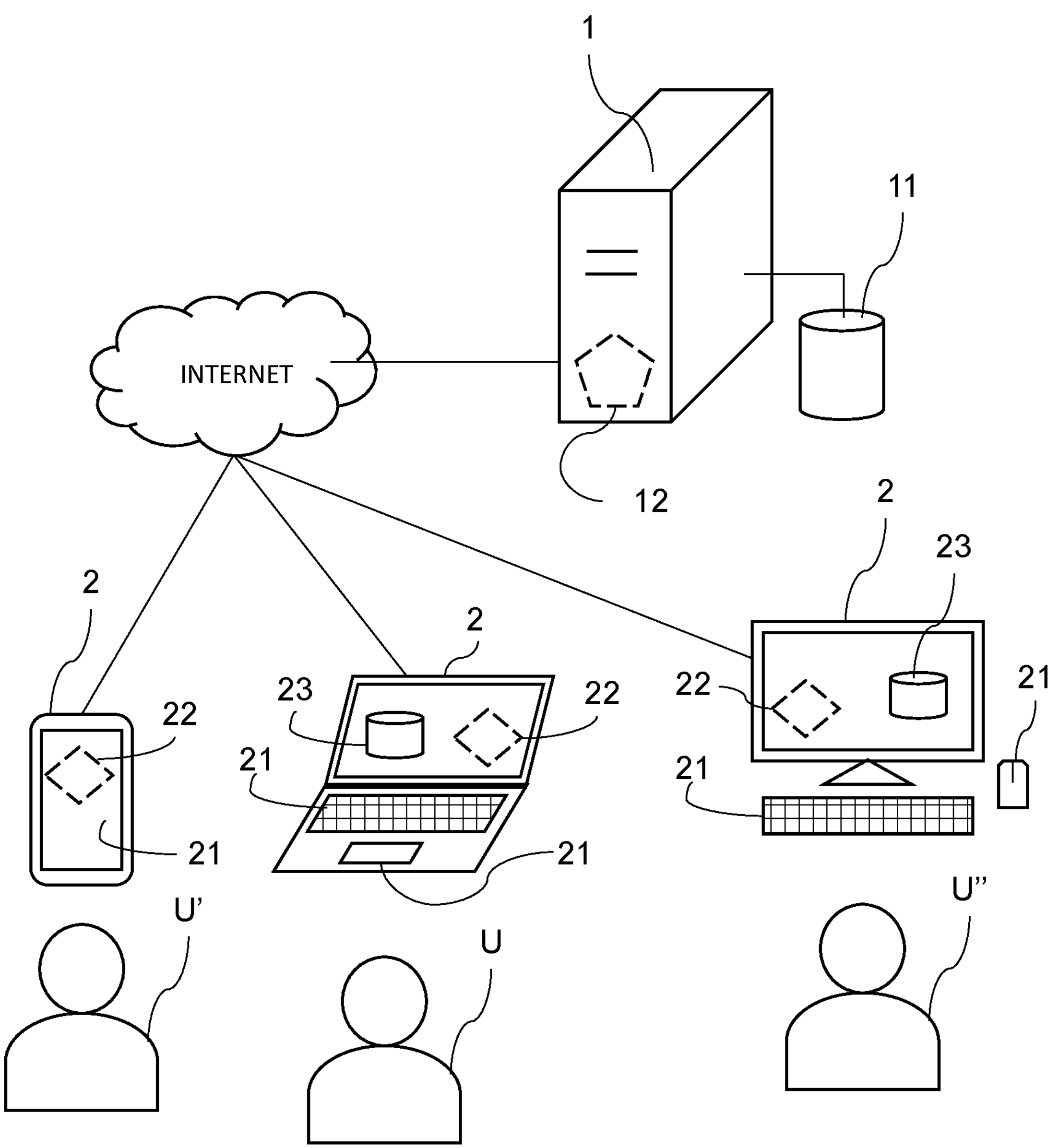
FIG. 3 shows the system in which the method of the present invention is implemented.

Once a sufficient number of samples have been collected, i.e. a certain number of complete typing sequences (e.g. between 15 and 20 sequences), the script builds one or more machine learning templates locally on the user endpoint (step f1 in FIG. 2) based on the samples extracted from the biometric data (step e1 in FIG. 2).

With each subsequent access to the web application, i.e. to the online service, a prediction of the user is requested through the machine learning template (step h of the method). This prediction returns a score that varies between 0 and 1, where 0 represents a high risk, that is, a very different typing from the typing sequences collected in the machine learning template, and 1 represents a very similar typing to that collected.

The score is sent to the back-end, together with technical browsing data, such as the user name used in accessing the service and the session ID.

This score can then be used by the back-end to define risk rules on the application, such as blocking the user's login, requesting an SCA or informing the user about his access at risk.

The invention claimed is:

1. A method for confirming the identity of a user in a browsing session of an online service, comprising the steps of:

a) providing a web server in which an online service resides, the web server being in communication with at least one client device provided with at least one user interface;

b) providing a database associated with the web server in which a plurality of data relating to one or more users registered to the online service are stored;

c) providing a script residing on the client device;

d) identifying via the script each browsing session on the online service and associating it with a user registered to the online service when said user performs authentication;

e) collecting via the script biometric data generated by said at least one user interface and associating them with the authenticated user, the biometric data comprising one or more sets of sensitive data chosen from a typing pattern on a keyboard of the user interface, a movement pattern of the cursor of the user interface, and a usage pattern of the user interface;

f) generating machine learning templates via the script as a result of processing biometric data;

g) storing biometric data and machine learning templates locally in the client device such that sensitive biometric data are in no way shared outside the environment of the client device as they are not sent to the web server;

h) generating a score associated with the user as a result of the processing via the script of new biometric data collected on said at least one user interface based on the machine learning templates generated in step f);

i) sending only the score to the web server, such that there is no sharing of the sensitive biometric data with the web server; and l) verifying the identity of the authenticated user as a result of the score processing by means of a security algorithm residing on the web server.

2. The method for confirming the identity of a user in a browsing session according to claim 1, wherein step h) of generating a score associated with the user comprises the sub-step of attributing to the score a value between 0 and 1, where 0 represents a difference between the expected identity and the one calculated for the user using the machine learning templates, while 1 represents an exact association between the expected and calculated identity for the user using the machine learning templates.

3. The method for confirming the identity of a user in a browsing session according to claim 1, wherein step l) of verifying the identity of the authenticated user comprises the sub-step of generating a danger signal via the web server when the score value exceeds a predefined threshold value.

4. The method for confirming the identity of a user in a browsing session according to claim 3, comprising the step of m) activating security countermeasures on the client device when the web server generates the danger signal.

5. The method for confirming the identity of a user in a browsing session according to claim 4, wherein the security countermeasures comprise one or more among blocking the user's login, requesting a Strong Customer Authentication, blocking one or more transactions or actions performed by the user in the browsing session, and informing the user about his access at risk.

6. The method for confirming the identity of a user in a browsing session according to claim 1, wherein step i) of sending the score to the web server, comprises the sub-step of:

generating via said script technical data relating to the browsing of the client device on the online service and sending it to the web server together with the score.

7. The method for confirming the identity of a user in a browsing session according to claim 6, wherein the technical data comprise one or more among the user name used in accessing the online service, browsing session ID, client device fingerprint, network data.

8. The method for confirming the identity of a user in a browsing session according to claim 1, wherein step f) of generating machine learning templates via script comprises the sub-step of:

generating the machine learning templates through one or more artificial intelligence algorithms or through, or in combination with, heuristic algorithms and logical processes based on preset rules.

9. The method for confirming the identity of a user in a browsing session according to claim 1, wherein the script comprises a script agent executable within a web browser of the client device, or a client library executable within a mobile application of the client device.

10. The method for confirming the identity of a user in a browsing session according to claim 1, wherein step g) of locally storing biometric data and machine learning templates in the client device comprises the sub-step of:

storing the biometric data and the machine learning templates in a local memory of the client device or in the LocalStorage of the web browser of the client device.

* * * * *